P. LOPEZ.
WHEEL.
APPLICATION FILED NOV. 27, 1915.
1,193,806.
Patented Aug. 8, 1916.
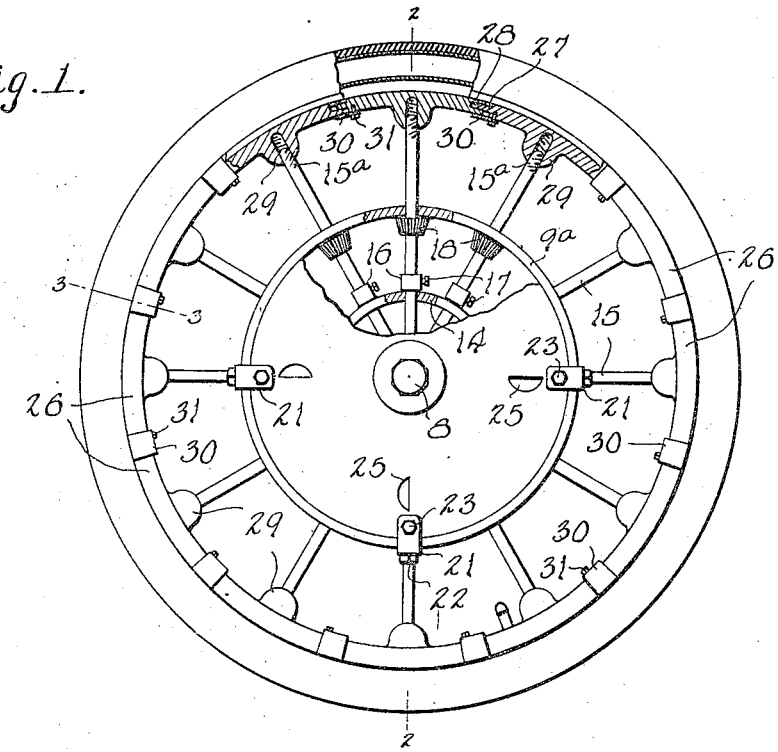
Fig. 1.
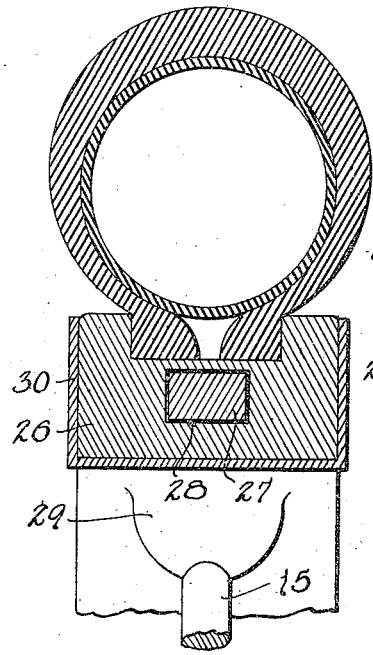
Fig. 3.
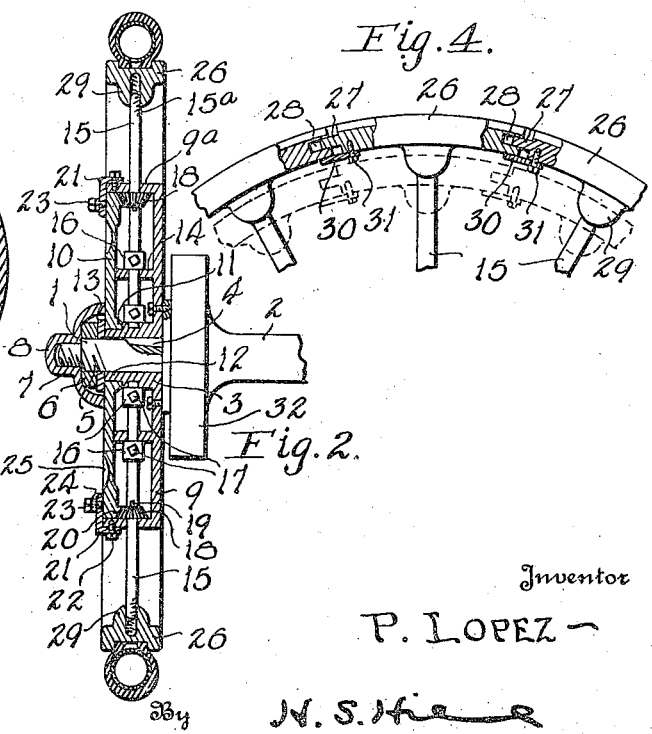
Fig. 4.
Fig. 2.
Inventor
P. LOPEZ
By N. S. H......
Attorney

UNITED STATES PATENT OFFICE.

PETE LOPEZ, OF TUOLUMNE, CALIFORNIA.

WHEEL.

1,193,806.	Specification of Letters Patent.	Patented Aug. 8, 1916.

Application filed November 27, 1915. Serial No. 63,859.

*To all whom it may concern:*

Be it known that I, PETE LOPEZ, a citizen of the United States, residing at Tuolumne, in the county of Tuolumne, State of California, have invented a new and useful Wheel; and I do hereby declare the following to be a full, clear, and exact description of the invention, such as will enable others skilled in the art to which it appertains to make and use the same.

The present invention relates to certain new and useful improvements in vehicle wheels, and has for its object to provide a wheel of this character which embodies novel features of construction whereby the felly can be expanded and contracted to admit of a tire being placed in position thereon or removed therefrom, such a construction being especially advantageous where the wheels are equipped with pneumatic tires which must necessarily be frequently changed.

Further objects of the invention are to provide a wheel of this character which is comparatively simple and inexpensive in its construction, which can be easily and quickly manipulated without the use of any special tools, which will enable a tire to be removed from the wheel or placed in position thereon with a comparatively small amount of labor, and which will not in any manner detract from the necessary strength of the wheel.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a side elevation of a wheel constructed in accordance with the invention, portions being broken away and shown in section. Fig. 2 is a transverse sectional view through the wheel. Fig. 3 is a detail transverse sectional view through the felly of the wheel. Fig. 4 is a detail view of a portion of the felly of the wheel, portions being broken away and shown in section, and the wheel being shown in its expanded position by solid lines and in its contracted position by dotted lines.

Corresponding and like parts are referred to in the following description and indicated in all the views of the drawing by the same reference characters.

For the purpose of illustration the invention is shown as embodied in one of the drive wheels of an automobile, the numeral 1 designating the axle, 2 a portion of the axle housing, and 3 the wheel hub which is keyed upon the end of the axle at 4. The end of the axle is provided with the large threads 5 for engagement with a bur 6, and also with smaller threads 7 for engagement with the cap 8.

Integral with the hub sleeve 3 is an axle casing 9 providing a chamber which is closed at the front of the wheel by rotatably mounted plate 10, the center of the said plate being formed with a bearing sleeve 11 which is loosely fitted upon an exterior bearing 12 provided at the outer end of the hub 3. The base of the cap 8 engages the rotatable plate 10 and assists in retaining the same in position. A washer member 13 is interposed between the bur 6 and the hub 3, and the periphery of the washer member also projects over the edges of the plate 10 so as to assist in holding the plate in position.

The annular casing 9 is provided at the outer edge thereof with a peripheral flange 9ª, and also at an intermediate point with an annular flange 14, said flanges 9ª and 14, as well as the hub 3, being provided with suitable bearings within which the radially disposed spokes 15 are journaled. Collars 16 are locked upon the inner ends of the spokes 15 by means of set screws 17, and normally bear against the annular flange 14 and hub 3 in such a manner as to hold the spokes against inward longitudinal movement. Each of the spokes 15 is also provided with a bevel pinion 18 which is secured thereto by means of a suitable key 19 and bears against the inner face of the flange 9ª so as to hold the spoke against outward longitudinal movement. The periphery of the rotatably mounted plate 10 is received within the outer edge of the flange 9ª, and is provided with an inwardly projecting annular rack 20 meshing with the pinions 18 of all of the spokes 15. This plate 10 is normally locked against rotation, although it will be obvious that by turning the same all of the spokes 15 will be simultaneously rotated about their longitudinal axes. Angle clips 21 are applied to the outer edge of the flange 9ª by suitable means such as the screws 22, one of the arms of each of the angle clips projecting over the edge of the rotatable plate 10 and being provided with a set screw 23 adapted to be screwed into engagement with the plate to hold the plate against rotation. Lock nuts 24 are shown as applied to the set screws 23 for the purpose of preventing them from working loose. Notches in the outer face of the rotatable plate 10 provide suitable hand-holds 25, so that after loosening the set screws 23 the plate can be easily turned to rotate the spokes 15 in either direction.

The felly of the wheel is formed in a series of independent sections 26, each of said sections being provided at one end thereof with a tongue 27, and at the opposite end thereof with a recess 28 adapted to receive the tongue 27 of the adjacent section. At its middle portion each of the sections 26 is formed with a threaded socket 29 which receives the threaded extremity 15ª of one of the spokes 15. Applied to one end of each of the sections 26 is a sleeve or casing 30, said casing being held in position by any suitable means such as the screw 31, and being adapted to telescope over the end of the adjacent felly section.

When it is desired to contract the felly, the set screws 23 are loosened and the plate 10 rotated to turn the spokes 15 and cause the threaded extremities 15ª thereof to be threaded more deeply into the sockets 29 of the sections 26, thereby simultaneously drawing all of the said felly sections inwardly toward the hub and reducing the diameter of the wheel. After the tire has been again placed in position upon the felly, the plate 10 is rotated in the opposite direction and the threaded extremities 15ª of the spokes 15 unscrewed from the sockets 29 so as to force the felly sections 26 outwardly and again expand the wheel. When the wheel is expanded there is a space between the ends of adjacent felly sections 26, although the casings or sleeves 30 cover these spaces so as to exclude mud and dirt therefrom. When the felly is contracted a tire can be readily placed in position upon the wheel or removed therefrom, although after the felly has been expanded the tire will be retained securely in position thereon.

The hub of the wheel is shown as provided with the usual brake drum 32, although this is of the conventional construction and constitutes no part of the present invention.

Having thus described the invention, what I claim as new and desire to secure by Letters Patent, is:—

1. A vehicle wheel including an expansible felly formed in a series of independent sections each of which is provided with a threaded socket, a hub, an annular casing surrounding the hub and having an open side, radially extending spokes having the inner ends thereof journaled within the annular casing, while the outer ends thereof are threaded for engagement with the before mentioned threaded sockets of the felly sections, means for locking the spokes against longitudinal movement, pinions applied to the spokes, a plate rotatably mounted upon the hub and closing the open side of the casing, an anuular rack upon the plate for engagement with the pinions of the spokes to simultaneously rotate all of the spokes, and means for locking the plate against rotation.

2. A vehicle wheel including an expansible felly formed in a series of independent sections each of which is provided with a threaded socket, a hub, an annular casing surrounding the hub and having an open side, said casing being formed with an outer annular flange and also with an inner concentric annular flange, radially extending spokes having the inner ends thereof journaled within the flanges of the casing, set collars applied to the spokes and bearing against the inner flange to lock the spokes against inward longitudinal movement, pinions applied to the spokes and bearing against the outer flange to lock the spokes against outward longitudinal movement, the outer ends of the spokes being threaded for engagement with the before mentioned threaded sockets of the felly sections, a plate rotatably mounted upon the hub and closing the open side of the casing, an annular rack upon the plate for engagement with the pinions of the spokes to simultaneously rotate the spokes, and means for locking the plate against rotation.

3. A vehicle wheel including an expansible felly formed in a series of independent sections each of which is provided with a threaded socket, a hub, an annular casing surrounding the hub and having an open side, said casing being formed with an annular flange, radially disposed spokes having the inner ends thereof journaled upon the casing flange and hub, while the outer ends thereof are threaded for engagement with the before mentioned threaded sockets of the felly sections, pinions applied to the spokes and engaging the casing flange to hold the spokes against outward longitudinal movement, inward longitudinal movement being prevented by the hub, a rotatable plate mounted upon the hub and closing the open side of the casing, an annular rack upon the plate for engagement with the before mentioned pinions of the spokes to simultaneously rotate all of the spokes and means for locking the plate against rotation.

In testimony whereof I have signed my name to this specification in the presence of two subscribing witnesses.

PETE LOPEZ.

Witnesses:
 IVAR EKMAN,
 WITMAR LEWIS.